United States Patent Office 3,310,380
Patented Mar. 21, 1967

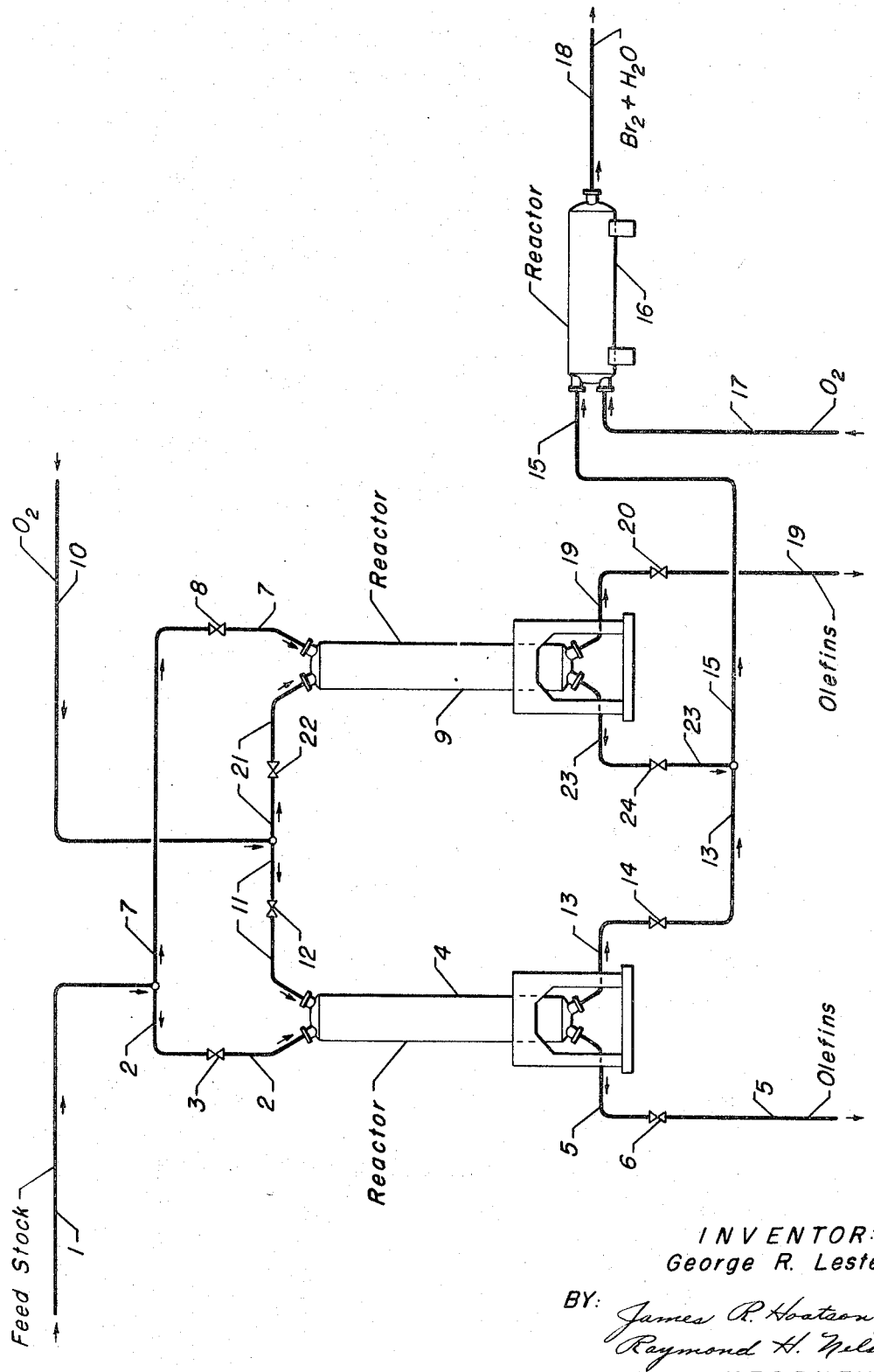

3,310,380
BROMINE RECOVERY
George R. Lester, Mount Prospect, Ill., assignor to Universal Oil Products Company, Des Plaines, Ill., a corporation of Delaware
Filed Feb. 13, 1964, Ser. No. 344,731
6 Claims. (Cl. 23—216)

This invention relates to a process for the recovery of elemental bromine and particularly to a process for the oxidation of hydrogen bromide to recover the desired compound. More specifically the invention is concerned with a process for the quantitative recovery of elemental bromine from hydrogen bromide utilizing a two-step process.

Unsaturated hydrocarbons and particularly olefinic hydrocarbons, both mono- and diolefinic in nature, are useful as intermediates in many organic reactions or as starting material for the preparation of useful compositions of matter, a specific example of which is the use of butadiene in the preparation of snythetic rubber. These unsaturated hydrocarbons may be prepared from more saturated hydrocarbons by halogenation to form an alkyl halide which is subsequently dehydrohalogenated to produce the desired unsaturated hydrocarbon. A particularly useful halogen of this reaction comprises bromine whereby a more saturated hydrocarbon is brominated to form an alkyl bromide which is thereafter dehydrobrominated to produce the desired unsaturate and hydrogen bromide. The dehydrohalogenation is usually effected by heating the halohydrocarbon at decomposition temperatures thus forming a dehydrohalogenation mixture comprising the olefinic hydrocarbon product and hydrogen halide. Another method of dehydrohalogenating and particularly dehydrobrominating alkyl bromides is the use of certain metallic oxides as dehydrobrominating reagents to remove hydrogen bromide from the alkyl bromide and the reaction mixture quantitatively.

This method of preparing olefinic hydrocarbons is economically attractive provided that the resulting hydrogen bromide which has been formed in the dehydrohalogenating step can be efficiently separated from the dehydrohalogenation mixture, and further provided that the halogen can be regenerated from the hydrogen halide in quantitative amount and recovered as elemental bromine for reuse in the first mentioned halogenation step.

It is therefore an object of this invention to provide a process for the quantitative recovery of bromine from adsorbed or chemically bound bromine.

A further object of this invention is to provide an improved process for the oxidation of a hydrogen halide, and particularly hydrogen bromide, in a two-step process in the presence of certain catalytic compositions of matter whereby the bromine may be recovered quantitatively for reuse.

In a broad aspect of this invention one embodiment resides in a process for the recovery of bromine which comprises passing a hydrocarbon stream containing combined bromine into a first reactor containing a catalytic-adsorbent composite, contacting said stream with said composite, sorbing hydrogen bromide on said composite, recovering unsaturated hydrocarbons, contacting said composite with an oxygen-containing gas at oxidation conditions, passing the resultant effluent comprising bromine, water and unreacted hydrogen bromide into a second reactor, contacting said effluent with a catalytic-inert support composite and an oxygen-containing gas at oxidation conditions, and recovering elemental bromine.

A further embodiment of this invention is found in a process for the recovery of bromine which comprises passing a hydrocarbon stream containing combined bromine into a first reactor containing a catalytic-adsorbent composite, contacting said stream with said composite, sorbing hydrogen bromide on said composite, recovering unsaturated hydrocarbons, contacting said composite with an oxygen-containing gas at a temperature in the range of from about 50° to about 450° C., passing the resultant effluent comprising bromine, water and unreacted hydrogen bromide into a second reactor, contacting said effluent with a catalytic-inert support composite with an oxygen-containing gas at a temperature in the range of from about 200° to about 600° C., and recovering elemental bromine.

A specific embodiment of this invention is found in a process for the recovery of bromine which comprises passing a hydrocarbon stream containing combined bromine into a first reactor containing a catalytic-adsorbent composite comprising from about 0.5 to about 10% by weight of copper oxide composited on magnesium oxide, contacting said stream with said composite, sorbing hydrogen bromide on said composite, recovering unsaturated hydrocarbons, thereafter contacting said composite with an oxygen-containing gas at a temperature in the range of from about 50° to about 450° C., passing the resultant effluent comprising bromine, water and unreacted hydrogen bromide into a second reactor, contacting said effluent with a catalytic-inert support composite comprising from about 2 to about 50% by weight of copper oxide composited on zirconia and an oxygen-containing gas at a temperature in the range of from about 200° to about 600° C., and recovering elemental bromine.

Other objects and embodiments will be found in the following further detailed description of this invention.

As hereinbefore set forth the present invention is concerned with an improved process for the quantitive recovery of bromine from absorbed or chemically bound bromine which comprises passing a hydrocarbon steam containing combined bromine through a catalytic-absorbent composite whereby bromine in a combined form is absorbed by the composite, passing and oxygen-containing gas through said composite and thereafter contacting the resulting effluent which comprises bromine, water and hydrogen bromide with a second catalytic composition of matter comprising a catalytic-inert support composite thereby insuring the quantitative recovery of elemental bromine. The hydrocarbon steam containing combined bromine which is passed through the catalytic-absorbent composite comprises either an alkyl bromide, for example, ethyl bromide, propyl bromide, butyl bromide, pentyl bromide, hexyl bromide, heptyl bromide, octyl bromide, nonyl bromide, and higher homologs thereof containing up to about 20 carbon atoms, etc.; the various position and structural isomers thereof including 2-bromopropane, 2-bromobutane, 2-bromopentane, 3-bromopentane, 2-bromohexane, 3-bromohexane, 2-bromo-2-methylbutane, 2-bromo-2,3-dimethylbutane, 2-bromo-2-methylpentane, 3-bromo-3-methylpentane, 2-bromo-2,3-dimethylpentane, 2-bromo-2,4-dimethylpentane, 2-bromo-2-methylhexane, etc.; cycloalkyl bromides, such as cyclobutyl bromide, cyclopentyl bromide, cyclohexyl bromide, cycloheptyl bromide, etc.; and alkyl dibromides, such as 2,3-dibromobutane, 2,3-dibromo-2-methylbutane, 2,3-dibromo-2,3-dimethylbutane, 2,3-dibromopentane, 2,3-dibromo-2-methylpentane, 2,3-dibromo-3-methylpentane, 2,3-dibromo-2,3-dimethylpentane, 2,3-dibromohexane, 2,3-dibromo - 2 - methylhexane, 2,3 - dibromo-2,3-dimethylhexane, 3,4-dibromo-3-methylhexane, 3,4-dibromo-3,4-dimethylhexane, etc. or a dehydrohalogenation mixture containing the dehydrobrominated alkyl bromide and hydrogen bromide.

If the hydrocarbon steam containing combined bromine comprises an alkyl bromide, the dehydrobromination is usually effected at a temperature in the range of from about 50° to about 550° C., a temperature in the lower range of from about 50° to about 450° C. being suitable in the treatment of monobromides, and a temperature in the higher range of from about 200° to about 550° C. being suitably employed in the treatment of dibromides. The dehydrobromination is effected in contact with the catalyst-adsorbent composite hereinafter fully described in greater detail which is an active promoter with respect to dehydrobromination of alkyl bromides.

The method of this invention can be utilized to effect either a continuous or batch type operation. The hydrocarbon stream containing combined bromine is charged to a reactor at dehydrobromination conditions, said reactor containing a catalyst-adsorbent composite of a type hereinafter described in great detail. The olefinic hydrocarbon product is recovered from the reactor effluent while the hydrogen bromide is adsorbed on the aforementioned composite. This catalyst-adsorbent composite comprises an oxidation catalyst such as copper oxide or cerium oxide composited on an oxide of a metal selected from the group consisting of magnesium, calcium and zinc, said copper oxide or cerium oxide being present in an amount within the range of from about 0.5 to about 10% by weight of the composite. The magnesium oxide, calcium oxide or zinc oxide will act as an adsorbent for the hydrogen bromide. It is contemplated that the hydrogen bromide is sorbed on the catalyst-adsorbent composite in physical and/or chemical combination therewith in such a manner that at least some portion of the bromine exists in a combined form other than hydrogen bromide, for example, magnesium bromide. However, it is not intended to limit the method of this invention by such theoretical considerations inasmuch as in either case elemental bromine is readily regenerated on subsequent oxidation. In either case, the hydrogen bromide is bound in this physical and/or chemical combination with the solid absorbent composite in perference to recombination or reaction with the olefinic hydrocarbon product.

Before the hydrogen bromide capacity of the catalyst-adsorbent composite is reached or exceeded, the alkyl bromide charged is halted and the adsorbed hydrogen bromide is oxidized to bromine and water by passing a stream of oxygen or oxygen-containing gas such as air over the absorbed hydrogen bromide at conditions effecting the oxidation of the hydrogen bromide to elemental bromine. The oxidation of the oxygen bromide to elemental bromine by the passage of oxygen or an oxygen-containing gas such as air over the catalyst-adsorbent composite containing sorbed hydrogen bromide is extremely exothermic in nature and as the catalyst bed is heated by the heat enclosed in the reaction zone, hydrogen bromide is desorbed on the downstream side of what might be termed the reaction front. Inasmuch as the gas passing this point is relatively poor in oxygen content in what might be termed "oxygen starvation" the hydrogen bromide is not oxidized completely to form elemental bromide and water. Therefore, the reaction effluent passing from this reaction zone will contain elemental bromine, water, hydrogen bromide and any unreacted gases from the feed mixture. The presence of hydrogen bromide in this mixture greatly increases the difficulty in separating the elemental or free bromine from water and the other components. Losses up to 10% of the bromine which is used per cycle may occur thereby increasing to a great extent the cost of the process and consequently making said process economically unattractive and prohibitive to operate.

However, as hereinbefore set forth, the bromine which is used in the bromination step of the more saturated hydrocarbon may be recovered in quantitative yields by subsequently passing the aforementioned reactor effluent comprising bromine, water, hydrogen bromide and any unreacted gases from the feed stock through a second reactor where said effluent is contacted with a catalytic-inert support composite and oxygen or an oxygen-containing gas such as air whereby direct oxidation of the hydrogen bromide occurs and the elemental bromine may be recovered in quantitative yields thereby.

The catalytic-adsorbent composite which is utilized in the first reactor comprises copper oxide or cerium oxide, and preferably copper oxide, as the catalytic component of the composite in an amount within the range of from about 0.5 to about 10% by weight composited on an adsorbent support. The adsorbent support comprises an oxide of a metal selected from the group consisting of magnesium, calcium and zinc. The catalytic-adsorbent composite may be prepared by any conventional method, for example, the adsorbent support can be soaked, dipped or otherwise immersed in an ammonical solution of a soluble compound of copper or cerium, for example, copper nitrate, cerium nitrate, cerium sulfate, etc., for a suitable period of time during which the excess solution is evaporated therefrom or decanted therefrom. Following this the composite is then calcined at a temperature of at least 400° C., generally at a temperature of from about 400° to about 800° C. and preferably at a temperature of from about 500° to about 700° C. for a suitable period of time, usually within a range of from about 1 hour to about 4 hours. The calcination may be effected in the presence of air or other oxidizing media, or in the presence of nitrogen or other inert atmospheres.

The catalytic-inert support composite which is in the second reactor and which is used along with oxygen or an oxygen-containing gas such as air to effect the direct oxidation of hydrogen bromide comprises a composite of an oxide of a metal selected from the group consisting of copper and cerium composited on an inert support, the preferred support containing a surface area within the range of from about 5 to about 100 square meters per gram. Examples of the preferred inert support comprise zirconia, alpha-alumina and theta-alumina. Supports which contain more than 100 square meters per gram are not preferred inasmuch as said supports will have a tendency to adsorb the hydrogen bromide when the reactor effluent is passed over the catalytic composition of matter and thus will not permit the total oxidation of the hydrogen bromide to form elemental bromine which will result in the recovery of substantially quantitative yields of said bromine. The catalytic-inert support composites may also be prepared in any conventional or otherwise convenient manner, one method comprising coprecipitating aqueous solutions of a soluble compound of copper or cerium with a salt of the inert support such as zirconyloxychloride by means of a caustic solution, washing the resulting precipitate until free of chloride, drying and calcinating the composite at temperatures similar to the calcination temperature hereinbefore set forth with regards to the preparation of the catalytic-adsorbent supports which are used in the first reaction zone. The oxide of the metal selected from the group consisting of copper and cerium is present in the finished composite in an amount ranging from about 2 to about 50% by weight of the inert support.

The present invention will be further illustrated with reference to the accompanying drawing which illustrates a simplified flow diagram of the present process. Various valves, coolers, condensers, pumps, controllers, etc. have been reduced, or entirely eliminated, as not being essential to the complete understanding of the present invention. The illustration of these, as well as other essential appurtenances, will become obvious as the drawing is described.

Referring now to the drawing, a charge stock comprising alkyl bromide is charged through lines 1 and 2, the latter containing valve 3, into reactor 4 which contains a catalytic-adsorbent composite of the type hereinbefore set forth in greater detail, a particular composite comprising from about 0.1 to about 10% by weight of copper oxide composited on magnesium oxide. The dehydrobromination of the alkyl bromide is then effected by heating the reactor to a temperature in the range of from about 50° to about 550° C., said temperature being dependent upon the particular alkyl bromide which is undergoing dehydrobromination. Upon completion of the desired dehydrobromination the unsaturated hydrocarbons are withdrawn from reactor 4 through line 5 provided with valve 6 and passed to storage. During this dehydrobromination process hydrogen bromide is sorbed on the catalytic-adsorbent composite. At a point before the hydrogen bromide capacity of the catalytic-adsorbent composite is reached or exceeded, the alkyl bromide charged to the reactor is halted and the charge passes through line 7 provided with valve 8 into reactor 9 which is also maintained at the proper operating conditions of temperature and pressure. When the alkyl bromide charged to reactor 4 is discontinued, oxygen or an oxygen-containing gas such as air is charged to reactor 4 through lines 10 and 11, the latter line being provided with valve 12. The oxidation of hydrogen bromide is then effected in reactor 4 at temperatures within the range of from about 50° to about 450° C. However, as hereinbefore set forth, due to the exothermicity of the oxidation process and the oxygen starvation of the reaction front, all of the hydrogen bromide which is desorbed from the composite will not be converted to elemental bromine and water. The reactor effluent is discharged from reactor 4 through line 13 provided with valve 14 into line 15 and is charged to a second reaction zone 16 which contains a catalytic-inert support composite which comprises an oxide of a metal selected from the group consisting of copper and cerium in an amount within the range of from about 2 to about 50% by weight of the inert support composited on an inert support. This inert support preferably has a surface area within the range of from about 5 to about 100 square meters per gram and preferably consists of either zirconia, alpha-alumina or theta-alumina. Reactor 16 is maintained at a temperature within the range of from about 200° to about 600° C. and approximately atmospheric pressure. In addition oxygen or an oxygen-containing gas is simultaneously charged to reactor 16 through line 17 whereby direct oxidation of the hydrogen bromide which is still present in the reactor effluent is accomplished. The reactor effluent from reactor 16 is withdrawn through line 18, said reactor effluent comprising elemental bromine, water and any unreacted gases which may have been present from the dehydrobromination reaction in the first reaction zone. Referring back to reactor 9, the dehydrobromination of the alkyl bromide which was charged to reactor 9 through lines 1 and 7 is carried out in a manner similar to that utilized for the dehydrobromination of the alkyl bromide charge in reactor 4. The unsaturated hydrocarbons are withdrawn through line 19 provided with valve 20 to storage. Before the hydrogen bromide capacity of the catalytic-adsorbent composite in reactor 9 is reached or exceeded, the alkyl bromide charge is cut off and reverts back to reactor 4 through lines 1 and 2. Oxygen or an oxygen-containing gas is then charged to reactor 9 through lines 10 and 21, the latter being provided with valve 22, whereby oxidation of the hydrogen bromide which has been sorbed on the catalytic-adsorbent composite in reactor 9 is effected. The reactor effluent comprising bromine, water, hydrogen bromide and any unreacted gases from the dehydrobromination reaction is withdrawn from reactor 9 through line 23 provided with valve 24 and is charged to reactor 16 through line 15 wherein it undergoes direct oxidation in the presence of oxygen or an oxygen-containing gas in contact with the catalytic-inert support composite hereinbefore set forth. By the direct oxidation of hydrogen bromide present to elemental bromine, all of said hydrogen bromide is converted and the reactor effluent from reactor 16 which is withdrawn through line 18 may be distilled and a quantitative recovery of elemental bromine effected. This elemental bromine may then be utilized in the bromination of more saturated hydrocarbons to prepare alkyl bromides, this portion of the reaction not being shown in the drawing. It is to be understood that the reaction of the present process may be effected utilizing only one reaction zone containing a catalytic-adsorbent composite or by utilizing more than two reactors containing the catalytic-adsorbent composite, the drawing of the present process showing two reactors being used only as an illustration of the process of this invention and that said invention is not necessarily limited thereto.

The following examples are given to illustrate the process of the present invention which, however, are not intended to limit the generally broad scope of the present invention in strict accordance therewith.

*Example I*

A catalyst was prepared by dissolving 1.3 g. of copper nitrate in 450 cc. of water along with 7.2 cc. of concentrated ammonium hydroxide. This solution was poured over 254.4 g. of magnesium oxide following which the excess water and ammonia were removed in a rotating evaporator. The resulting composite was then calcined for a period of 2 hours at 550° C., the finished catalyst containing 0.5% copper oxide on magnesium oxide.

A 120 cc. glass reactor tube having a 1.25 inch outer diameter was mounted in a vertical swing furnace. A catalyst portion comprising 23 g. (50 cc.) of the catalyst prepared in the above paragraph was placed in the reactor, porcelain rings were added and the catalyst was heated in nitrogen at a temperature of about 400° C. for a period of 4 hours. Hydrogen bromide was then passed over the catalyst at a ratio of about 1:10 moles of hydrogen bromide per mole of inert gas. The hydrogen bromide flow was discontinued when the visible adsorption band had penetrated to within one inch of the bottom of the catalyst bed. The catalyst was then cooled by passage of nitrogen over said catalyst and allowed to stand for a period of 16 hours. Following this the catalyst was then brought to the desired reaction temperature of about 285° C. using nitrogen. Dry air was then passed over the catalyst at a gaseous hourly space velocity of 3.23 for a period of about 2 hours. The effluent was recovered and it was found that 15.4% of the hydrogen bromide was oxidized to elemental bromine.

The reactor effluent which contains water, bromine and converted hydrogen bromide is passed over a catalyst composition which was prepared by dissolving 488 g. of zirconyloxychloride in 500 cc. of water and adding thereto a solution comprising 447 g. of cupric nitrate dissolved in 400 cc. of water. The resulting solution is then poured into 2600 cc. of 3 N sodium hydroxide. The resulting precipitate is filtered and washed with water containing a small amount of sodium hydroxide. The filter cake, after a series of washes, is dried, pilled and calcined for a period of about 2 hours at 600° C. The finished catalyst will contain about 44% by weight of copper oxide on zirconia.

A 25 cc. portion of the catalyst prepared according to the above paragraph is placed in a glass reactor mounted in a vertical swing furnace. The reactor effluent which was recovered from the passage of hydrogen bromide through the copper oxide on magnesia catalyst and air in a mixture containing about 20% stoichiometric excess of oxygen is passed upflow over the catalyst bed at a combined space velocity of 1000, said catalyst being maintained at a temperature of about 400° C. The effluent from this step is passed through a wet ice trap, a dry ice trap and thereafter into a caustic scrubber. It will be found that the percent of bromine conversion will be over 99%.

*Example II*

In this example a catalyst was prepared by dissolving 17.2 g. of cerium ammonium nitrate in 150 cc. of water and the solution was added to 100 g. of magnesium oxide. The solvent was removed in a rotary evaporator following which the catalyst was dried at 100° C. for 2.5 hours and thereafter calcined for an additional period of 2.5 hours at 500° C., the finished catalyst containing 5% cerium oxide on magnesium oxide.

Another catalyst is prepared by dissolving cupric nitrate in water and pouring the solution over theta-alumina spheres. The resulting catalyst composite is dried, calcined and reimpregnated with an additional cupric nitrate solution. The spheres are again dried and calcined, the finished catalyst containing 39% by weight of copper oxide on the inert support comprising theta-alumina.

A glass reactor tube was filled with 100 cc. (41.9 g.) of the cerium oxide on magnesia catalyst. The catalyst was heated in nitrogen to a temperature of about 400° C. for about 4 hours. Following this the temperature was allowed a cool to within the range of from about 175°–180° C. and maintained thereat while hydrogen bromide and helium in a combined gaseous hourly space velocity of 1054 was passed therethrough for a period of about 1 hour. The hydrogen bromide charge was discontinued and the catalyst allowed to cool while maintaining the helium flow. The cooled catalyst was allowed to stand for a period of about 16 hours following which it was brought up to a temperature of from about 270°–300° C. The inert gas flow was stopped and dry air at a gaseous hourly space velocity of 4.3 was passed over the catalyst for a period of about 6 hours. The reactor effluent was analyzed to determine that 56.2% of the hydrogen bromide was converted to elemental bromine.

The reactor effluent from the above step is passed through a reaction tube containing 25 cc. of the catalyst comprising 39% copper oxide on theta-alumina along with air at a combined space velocity of about 1000, said catalyst being maintained at a temperature of about 350° C. The reaction effluent from this step is passed through a wet ice trap, a Dry Ice trap and a caustic scrubber. An analysis of the effluent will disclose that over 99.8% of the hydrogen bromide converted to elemental bromine.

*Example III*

In this example a catalyst was prepared by dissolving 24.3 g. of copper nitrate in 150 cc. of water. Following this 35 cc. of 28% ammonium hydroxide was added, the solution was poured over 150 g. of magnesium oxide and the excess solution allowed to evaporate. The catalyst was dried at 110° C. for 1 hour and calcined for 2 hours at 500° C. A catalyst to be used in the second step of this process is prepared by admixing solutions of zirconyloxychloride and cerium sulfate followed by filtration, washing, drying and calcination.

A glass reactor tube was loaded with 100 cc. (40.2 g.) of the catalyst prepared according to the first paragraph above, said catalyst having a mesh of 14 and comprising 5% by weight of copper oxide on magnesia. The catalyst was treated with helium at a temperature of about 400° C. for a period of 4 hours following which the temperature of the reactor was allowed to cool to a temperature within the range of from about 180°–190° C. Hydrogen bromide and helium at a combined gaseous hourly space velocity of 1090 were charged through the catalyst for a period of about 1 hour, the hydrogen bromide charge being discontinued when the visible adsorption band has penetrated to within one inch of the bottom of the catalyst bed. Helium input was continued while cooling the reactor and catalyst. The cooled catalyst was allowed to stand for a period of about 16 hours. Following this the reactor and catalyst were heated to a temperature in the range of from about 260°–280° C. while passing helium through the catalyst. The helium flow was discontinued and dry air passed through the catalyst at a gaseous hourly space velocity of about 5.5 for approximately 5.5 hours. The reactor effluent was analyzed to determine that 64.2% of the hydrogen bromide was converted to elemental bromine.

The reactor effluent from the above step containing water, bromine and hydrogen bromide is passed into a reactor containing a catalytic-inert support composite comprising 9% cerium oxide on zirconia along with air at a combined hourly space velocity of 1000, the air/HBr ratio being 3/2. The temperature of the catalyst and reactor is maintained at 450° C. during this process. Analysis of the reactor effluent will disclose that the conversion of hydrogen bromide to elemental bromine will be in excess of 99.9%.

*Example IV*

A catalyst comprising copper oxide on a magnesia-zirconia base with 5.3% sodium present as an oxide was prepared in the manner similar to that hereinbefore set forth. In this experiment a cyclic dehydrobromination-oxidation reaction was run by placing the catalyst in a Pyrex glass reactor having a volume of 200 cc. The solid catalyst was placed in the reactor and held in place by a fritted glass plate. Isopropyl bromide was preheated in the bottom section of a furnace in a stainless steel coil and discharged as vapor on the underside of the porous plate. The effluent from the dehydrobromination step was passed through a cooled trap, a caustic scrubber and sampled, no isopropyl bromide being found so that the conversion was 100% in every run. When the total hydrogen bromide uptake of the catalyst was almost reached, the flow was discontinued. Between each step of the dehydrobromination-oxidation cycle, nitrogen was used to strip the catalyst of material left from the prior step. In the oxidation step dry air was measured through a rotameter operated at 18 p.s.i.g. and passed into the reactor directly, rather than through the preheater coil. The results of the cyclic operation is shown in Table I below.

TABLE I

|  | 1 | 2 | 3 | 4 | 5 | 6 | 7 |
| --- | --- | --- | --- | --- | --- | --- | --- |
| Initial Dehydrobromination Temperature, ° C | 250 | 250 | 250 | 250 | 300 | 350 | 250 |
| Maximum Temperature, ° C | 350 | 350 | 350 | 350 | 400 | 430 | 350 |
| LHSV (Isopropyl Bromide) | 1.11 | 1.10 | 1.10 | 1.10 | 1.16 | 1.24 | 1.20 |
| Duration of Run, Minutes | 30 | 28 | 22 | 22 | 23 | 25 | 20 |
| Conversion of Isopropyl Bromide | 100 | 100 | 100 | 100 | 100 | 100 | 100 |
| Mole of Propylene/100 Moles of Isopropyl Bromide Converted | 95.6 | 91.4 | 92.1 | 91.0 | 83.2 | 89.1 | 84.0 |
| Bromine Added to Catalyst, Grams | 95.3 | 88.0 | 69.9 | 69.9 | 76.0 | 80.9 | 68.0 |
| Initial Oxidation Temperature, ° C | 305 | 305 | 250 | 300 | 300 | 302 | 295 |
| Maximum Temperature, ° C | 455 | 380 | 372 | 415 | 415 | 400 | 380 |
| GHSV (Air) | 425 | 425 | 425 | 390 | 425 | 425 | 425 |
| Duration of Run, Minutes | 45 | 61 | 44 | 41 | 42 | 44 | 42 |
| Percent Elemental Bromine Removed | 96.9 | 93.3 | 98.6 | 94.2 | 87.5 | 97.1 | 97.0 |

A catalyst was prepared by dissolving 1800 g. of zirconyloxychloride in 2 liters of water, dissolving 246 g. of cerium sulfate in 2 liters of 0.5 N sulfuric acid and admixing the solutions. The mixed solution is quickly poured into 2380 cc. of 14% ammonium hydroxide. After filtering the precipitate on a vacuum funnel, the precipitate was washed with hot water and 20% ammonium nitrate for a period of 17 hours. The washed catalyst was oven dried for 20 hours at 120° C. and ground to a 10–30 mesh. Following this the granules were calcined for 2 hours at 600° C.

The reactor effluent from the oxidation step of the dehydrobromination-oxidation cycle of isopropyl bromide which contained water, bromine and unconverted hydrogen bromide ranging from 1.4 to 12.5% based on the total bromine out is passed into a reactor containing the catalytic-inert support composite prepared in the above paragraph, said composite comprising 9% cerium oxide on zirconia. In addition are is passed through the reactor so that the combined effluent-air hourly space velocity is 1000. The temperature of the catalyst and reactor is maintained at from about 410° to about 450° C. Analysis of the reactor effluent will dissolve that the conversion of hydrogen bromide to elemental bromine will be in excess of 99.9%.

I claim as my invention:

1. In a process for the recovery of bromine by passing a hydrocarbon stream containing combined bromine into a first reactor containing a catalytic-adsorbent composite selected from the group consisting of an oxide of copper and cerium on an oxide of a metal selected from the group consisting of magnesium, calcium and zinc, to dehydrobrominate same to produce unsaturated hydrocarbons and hydrogen bromide, contacting said stream with said composite and sorbing hydrogen bromide on the composite, recovering unsaturated hydrocarbons, and thereafter contacting said composite with an oxygen-containing gas at oxidation conditions to oxidize sorbed hydrogen bromide to bromine and water, the improvement which comprises passing the resultant first reactor effluent comprising bromine, water and unreacted hydrogen bromide into a second reactor, contacting said effluent in admixture with an oxygen-containing gas and at oxidation conditions in the second reactor with a catalytic-inert support composite selected from the group consisting of an oxide of copper and cerium on a substance selected from the group consisting of zirconia, alpha-alumina and theta-alumina and therein directly oxidizing the unreacted hydrogen bromide to bromine, and recovering the resultant elemental bromine.

2. The process of claim 1 further characterized in that the first-mentioned composite is contacted with the oxygen-containing gas in the first reactor at a temperature of from about 50° to about 450° C. and said effluent is contacted with the second-mentioned composite in the second reactor at a temperature of from about 200° to about 600° C.

3. The process of claim 1 further characterized in that said catalytic-inert support composite comprises from about 2 to about 50% by weight of copper oxide composited on zirconia.

4. The process of claim 1 further characterized in that said catalytic-inert support composite comprises from about 2 to about 50% by weight of copper oxide composited on alpha-alumina.

5. The process of claim 1 further characterized in that said catalytic-inert support composite comprises from about 2 to about 50% by weight of copper oxide composited on theta-alumina.

6. The process of claim 1 further characterized in that said catalytic-inert support composite comprises from about 2 to about 50% by weight of cerium oxide composited on zirconia.

References Cited by the Examiner

UNITED STATES PATENTS

| | | | |
|---|---|---|---|
| 2,163,877 | 6/1939 | Hooker | 23—216 |
| 2,536,457 | 1/1951 | Mugdan | 23—216 |
| 3,233,978 | 2/1966 | Alkemade | 23—215 X |

FOREIGN PATENTS 913,276  12/1962  Great Britain.

OTHER REFERENCES

Ladoo and Myers: Non-Metallic Minerals, McGraw-Hill, 2nd edition, 1951, page 408.

OSCAR R. VERTIZ, *Primary Examiner.*

EDWARD STERN, *Examiner.*